US008600222B2

(12) United States Patent
Aoki et al.

(10) Patent No.: US 8,600,222 B2
(45) Date of Patent: Dec. 3, 2013

(54) IMAGING APPARATUS

(75) Inventors: Shoichi Aoki, Kanagawa (JP); Osamu Iida, Kanagawa (JP); Manabu Hanjo, Kanagawa (JP); Tetsuro Miyazaki, Kanagawa (JP); Ryuji Iwashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 248 days.

(21) Appl. No.: 12/943,169

(22) Filed: Nov. 10, 2010

(65) Prior Publication Data

US 2011/0116774 A1 May 19, 2011

(30) Foreign Application Priority Data

Nov. 17, 2009 (JP) ................. P2009-262094

(51) Int. Cl.
*H04N 5/77* (2006.01)
(52) U.S. Cl.
USPC .......................... 386/362; 386/358
(58) Field of Classification Search
USPC ............ 348/373, 374, 376; 355/24; 386/230; 396/427
See application file for complete search history.

(56) References Cited

U.S. PATENT DOCUMENTS

| 1,604,765 | A | * | 10/1926 | Caps ............................ 355/24 |
| 2,315,406 | A | | 3/1943 | Eddy |
| 6,728,480 | B1 | * | 4/2004 | Maeda et al. .................. 396/25 |
| 8,189,098 | B2 | * | 5/2012 | Maruyama et al. ........... 348/374 |
| 2005/0084252 | A1 | * | 4/2005 | Satou et al. .................. 386/126 |
| 2006/0256230 | A1 | * | 11/2006 | Maeda ......................... 348/373 |

FOREIGN PATENT DOCUMENTS

| JP | 11 26969 | 1/1999 |
| JP | 2005-63534 | 3/2005 |
| JP | 2006-295803 | 10/2006 |
| WO | WO 00/04720 | 1/2000 |

* cited by examiner

*Primary Examiner* — Thai Tran
*Assistant Examiner* — Stephen Smith
(74) *Attorney, Agent, or Firm* — Frommer Lawrence & Haug LLP; William S. Frommer; Ellen Marcie Emas

(57) ABSTRACT

Disclosed herein is an imaging apparatus including: an apparatus body in which a heat radiating part is disposed; and a heat dissipating section formed at an upper portion of the apparatus body, wherein the heat dissipating section has a recess provided in an upper portion of the apparatus body, and a closing plate so mounted as to close the recess, a space is formed between the recess and the closing plate, the recess is formed with a vent hole through which the inside of the apparatus body and the space communicate with each other, the closing plate is provided with a heat dissipating hole through which the space communicates with the exterior, and the vent hole and the heat dissipating hole are positionally deviated from each other.

9 Claims, 7 Drawing Sheets

IMAGING APPARATUS

BACKGROUND OF THE INVENTION

1. Field of the Invention

The present invention relates to an imaging apparatus in which a heat dissipating section having a heat dissipating function and an anti-waterdrop function is provided at an upper portion of an apparatus body.

2. Description of the Related Art

Of video cameras which are imaging apparatuses, video cameras for business use have large power consumptions and high calorific values. In such a business-use video camera, therefore, a cooling fan is provided inside a camera body to perform forced heat dissipation. However, the method of performing forced heat dissipation by a cooling fan leads to the generation of a cooling fan driving part and the generation of exhaust noise. In addition, such a method complicates the configuration of the camera body and increases power consumption due to the driving of the cooling fan.

To cope with this problem, Japanese Patent Laid-open No. Hei 11-26969 (hereinafter referred to as Patent Document 1) discloses an electronic apparatus in which a vent hole is formed in a side surface, and natural heat dissipation through the vent hole in the side surface is adopted instead of using a cooling fan. However, the electronic apparatus according to Patent Document 1, in which the vent hole is formed in the side surface, is not good in heat dissipating efficiency as compared with the forced heat dissipation by a cooling fan.

Furthermore, a video camera of the type of being carried on a shoulder, in general, is frequently used outdoors, so that it needs an anti-waterdrop function such as to prevent raindrops from entering into the inside of the camera body via the vent hole in a rainy weather.

SUMMARY OF THE INVENTION

Thus, there is a need for an imaging apparatus in which a heat dissipating section having an excellent heat dissipating function and an excellent anti-waterdrop function is provided at an upper portion of an apparatus body.

According to an embodiment of the present invention, there is provided an imaging apparatus including: an apparatus body in which a heat radiating part is disposed; and a heat dissipating section formed at an upper portion of the apparatus body. In the imaging apparatus, the heat dissipating section has a recess provided in an upper portion of the apparatus body, and a closing plate so mounted as to close the recess; a space is formed between the recess and the closing plate; the recess is formed with a vent hole through which the inside of the apparatus body and the space communicate with each other; the closing plate is provided with a heat dissipating hole through which the space communicates with the exterior; and the vent hole and the heat dissipating hole are positionally deviated from each other.

According to the embodiment of the present invention, air heated by a heat radiating part inside the apparatus body is discharged from the inside of the apparatus body into the space via the vent hole in the recess provided at an upper portion of the apparatus body, and, thereafter, the air is discharged from the space to the exterior via the heat dissipating hole positionally deviated from the vent hole. Consequently, heat can be dissipated efficiently through the upper portion of the apparatus body. Besides, since the vent hole and the heat dissipating hole are positionally deviated from each other, penetration of waterdrops into the inside of the apparatus body can be prevented while permitting heat to be dissipated through the upper portion of the apparatus body.

BRIEF DESCRIPTION OF THE DRAWINGS

FIGS. 5A and 5B are sectional views of the heat dissipating section, in which FIG. 5A illustrates the flow of air during heat dissipation, and FIG. 5B illustrates the flow of waterdrops having penetrated into the heat dissipating section;

DETAILED DESCRIPTION OF THE PREFERRED EMBODIMENTS

Figure 1:
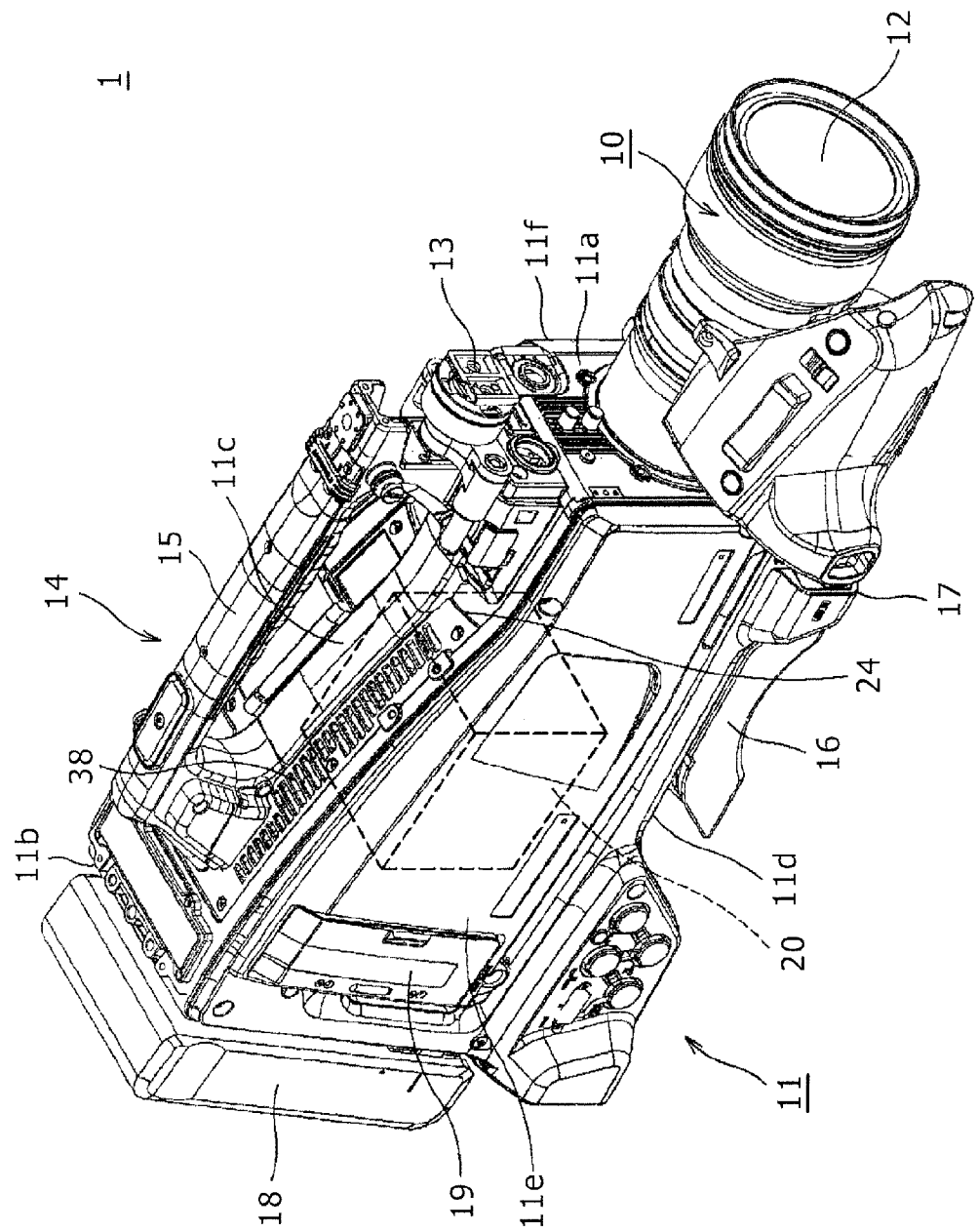
FIG. 1 is a perspective view of a video camera to which an embodiment of the present invention is applied.

Now, a best mode for carrying out the present invention will be described, in the following order.

1. General configuration of video camera
2. Configuration of heat dissipating section
3. Working effect of video camera
4. Modifications Hereafter, a video camera 1 to which an embodiment of the present invention has been applied will be described referring to the drawings.

[1. General Configuration of Video Camera]

Figure 2:
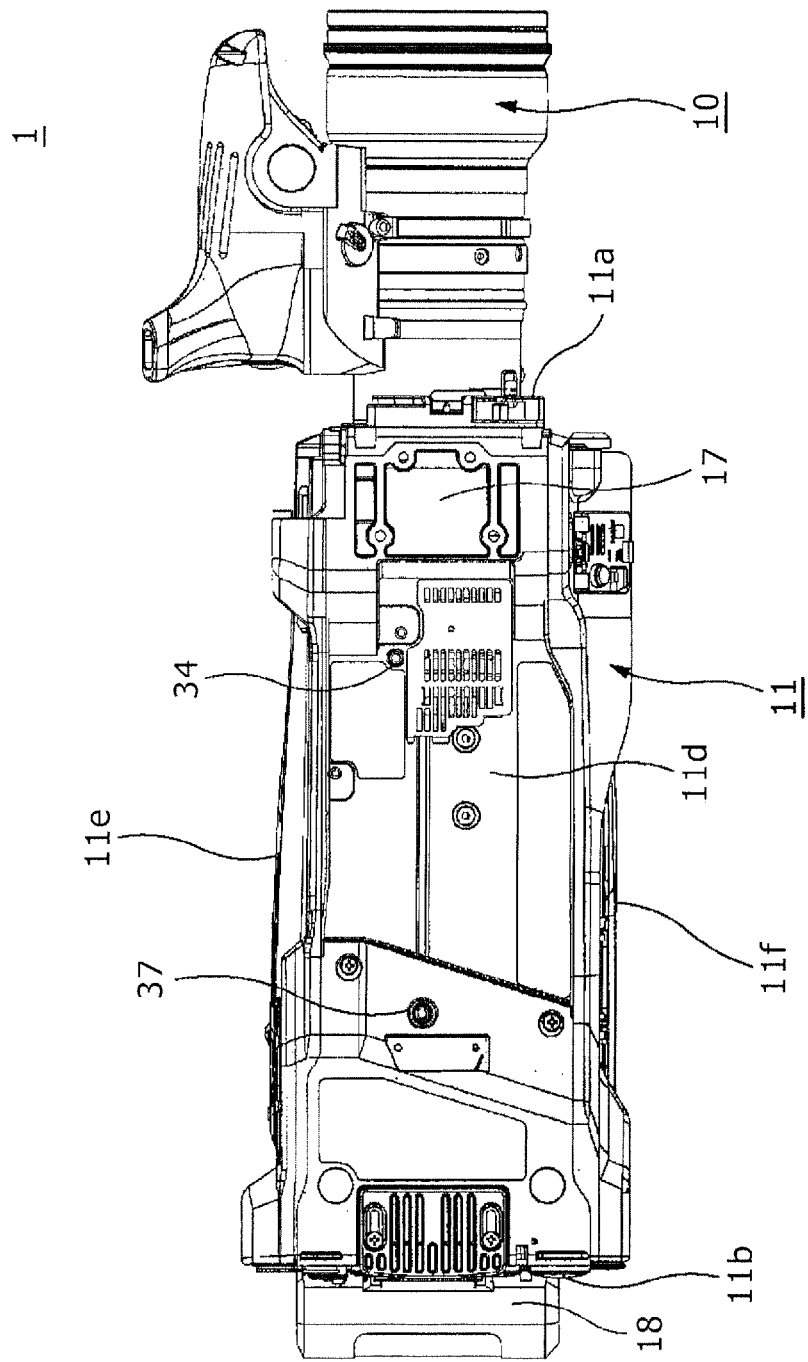
FIG. 2 is a bottom view of the video camera to which the embodiment is applied.

As shown in FIGS. 1 and 2, the video camera 1 to which the embodiment has been applied is a business-use video camera of the type of being carried on a shoulder, and is used mainly for imaging outdoors.

The video camera 1 includes a lens section 10 incorporating optical members for guiding an optical image from a subject to an image sensor in an apparatus body 11, and the apparatus body 11 for converting the optical image from the lens section 10 into an electrical signal so as to produce a picture signal.

The lens section 10 has an imaging lens 12 which is provided on a front surface 11a of the apparatus body 11 and which functions as an optical member for condensing the light coming from a subject. In addition, the lens section 10 has, for example, a zooming mechanism (not shown) and, by driving the zooming mechanism, it is possible to vary the optical magnification of the imaging lens 12 within a predetermined range.

The apparatus body 11 forms a main body of the video camera 1 which is substantially rectangular parallelopiped in shape. Of the apparatus body 11, a surface on one side in the longitudinal direction is the front surface 11a, and a top surface 11c as an upper portion has a curved inclined surface sloping down from the side of a rear surface 11b toward the side of the front surface 11a. At the front surface 11a of the apparatus body 11, there are provided the above-mentioned lens section 10 and a viewfinder mounting part 13 on which to mount a viewfinder. Besides, the apparatus body 11 is provided at its top surface 11c with a heat dissipating section 14 to be described later and a handle section 15. Further, the apparatus body 11 is provided at its bottom surface 11d with a shoulder pad 16 which functions as a cushion when the user carries the video camera 1 on his or her shoulder, and a tripod mounting part 17 for fixing the apparatus body 11 onto a tripod or the like. Furthermore, a battery 18 is provided on the rear surface 11*b* of the apparatus body 11.

Further, the apparatus body 11 has a light receiving element (not shown) such as a CCD (Charge-Coupled Device) which receives the light condensed by the imaging lens 12 constituting an imaging unit and performs photo-electric conversion, thereby picking up an image of the subject. The apparatus body 11 has, for example, a spectral prism as an optical system by which the light condensed by the imaging lens 12 is separated into three primary color components, that is, red, green and blue components. The imaging unit is based on adoption of the so-called three-CCD system in which three CCDs are provided correspondingly to the separated color components. The apparatus body 11 as above has a picture signal processing circuit or the like for producing a picture signal according to the intensities of the light components received by the CCDs. Incidentally, while the CCD is used as the light receiving element here, this is not limitative. For example, a CMOS (complementary metal-oxide semiconductor device) or the like may be used as a photo-electric conversion element for performing efficient photo-electric conversion. Besides, the three-CCD system also is merely an example.

Furthermore, a recording and playback unit 19 for recording the picture signal outputted after the imaging at the light receiving element is incorporated in the apparatus body 11 near a side surface 11*e* on one side. The recording and playback unit 19 is provided somewhat closer to the rear surface 11*b* of the apparatus body 11. The recording and playback unit 19 has a mounting section for mounting a memory card incorporating a semiconductor memory such as a flash memory, and a memory card reader-writer by which recording and playback of information signals such as a picture signal and a sound signal are conducted in relation to the memory card mounted in the mounting section. Therefore, the apparatus body 11 has a function of recording the picture signal in the memory card or playing back the information recorded in the memory card. Here, two IC card slots are provided in the side surface 11*e* of the apparatus body 11, in the state of being juxtaposed vertically.

Such a recording and playback unit 19 is smaller in size, as compared with a recording and playback unit in which such a recording medium as a magnetic tape and an optical disk is used. This promises a reduction in the size of the apparatus as a whole and an enhanced degree of freedom in layout. Further, in the apparatus body 11, the recording and playback unit 19 is provided somewhat closer to the rear surface 11*b* of the apparatus body 11. This ensures that the top surface 11*c* of the apparatus body 11 can be shaped to be inclined more steeply, as compared with the case where the above-mentioned recording medium other than the memory card is used. Therefore, the apparatus body 11 can provide a wide field of view at the time of viewing the side of the video camera 1 carried on the user's shoulder, that is, at the time of overview.

An editing operation unit (not shown) for operating predetermined functions of the video camera 1 and a display unit (not shown) are provided at a side surface 11*f* on the other side of the apparatus body 11. This permits the user to operate the editing operation unit while viewing the display unit. Besides, the display unit has, for example, a liquid crystal display panel, an organic EL panel, a CRT or the like.

Incidentally, while the recording and playback unit 19 is incorporated in the apparatus body 11 in the above-described example, the present invention may be embodied in such a manner that the apparatus body 11 is not provided therein with the recording and playback unit 19 and that recording and playback of information signals such as a picture signal are performed by use of a recording and playback unit connected to an external output terminal.

The handle section 15 is provided so that the user can grip it by hand for holding the video camera 1 when the user brings the video camera 1 or when the video camera 1 is used at a low position.

The shoulder pad 16 is formed in a concave shape at the bottom surface 11*d* of the apparatus body 11, and constitutes a part to be brought into contact with a user's shoulder when the video camera 1 is used in the state of being held on the user's shoulder. For making it easy to hold the video camera 1 on the user's shoulder, the shoulder pad 16 is formed by use of a soft or flexible material and in a shape having a curved surface.

The tripod mounting part 17 is provided with screw holes for connecting a tripod and the apparatus body 11 to each other.

A viewfinder is detachably mounted to the viewfinder mounting part 13. The viewfinder mounting part 13 is a plate-shaped member, and is provided, for example, with an engaging part for engagement with a mounting part of the viewfinder, and a stopper part for holding the viewfinder in the engaged state.

The battery 18 is a lithium ion battery or the like, and serves as a driving power source for the above-mentioned zooming mechanism, the recording and playback unit 19 and the like.

The apparatus body 11 configured as above includes, incorporated therein, not only the above-mentioned zooming mechanism, the recording and playback unit 19 and the image sensor but also a heat radiating part 20 for, for example, a power source by which predetermined electric power based on the power supplied from the battery 18 is supplied to the zooming mechanism, the recording and playback unit 19 and the image sensor. Accordingly, the heat dissipating section 14 for heat dissipation or release is provided at an upper portion of the apparatus body 11, as above-mentioned.

The heat dissipating section 14 provided at the top surface 11*c* constituting the upper portion of the video camera 1 configured as above will now be described in detail below.

[2. Configuration of Heat Dissipating Section]

Figure 3:
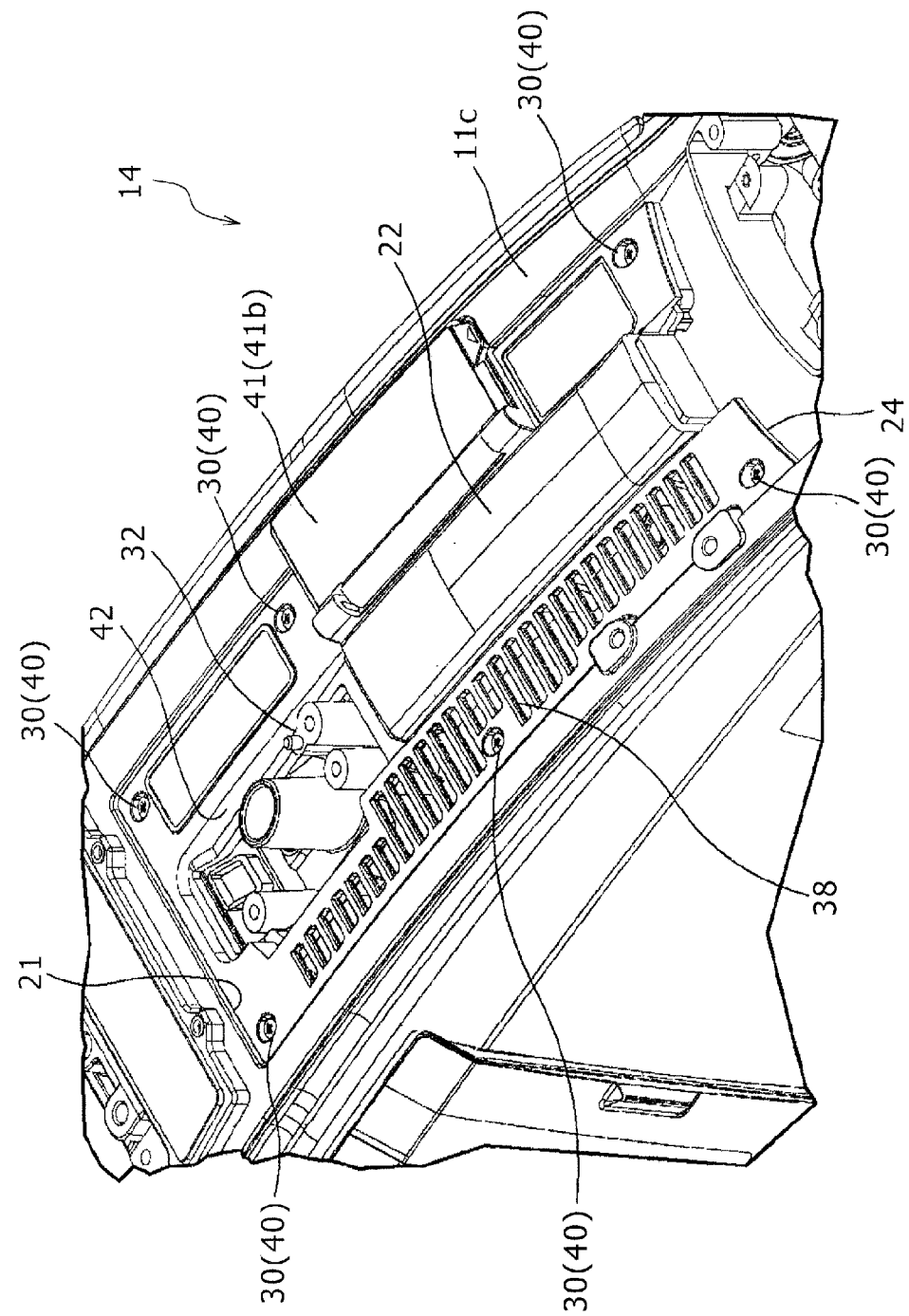
FIG. 3 is a perspective view of a heat dissipating section.
Figure 4:
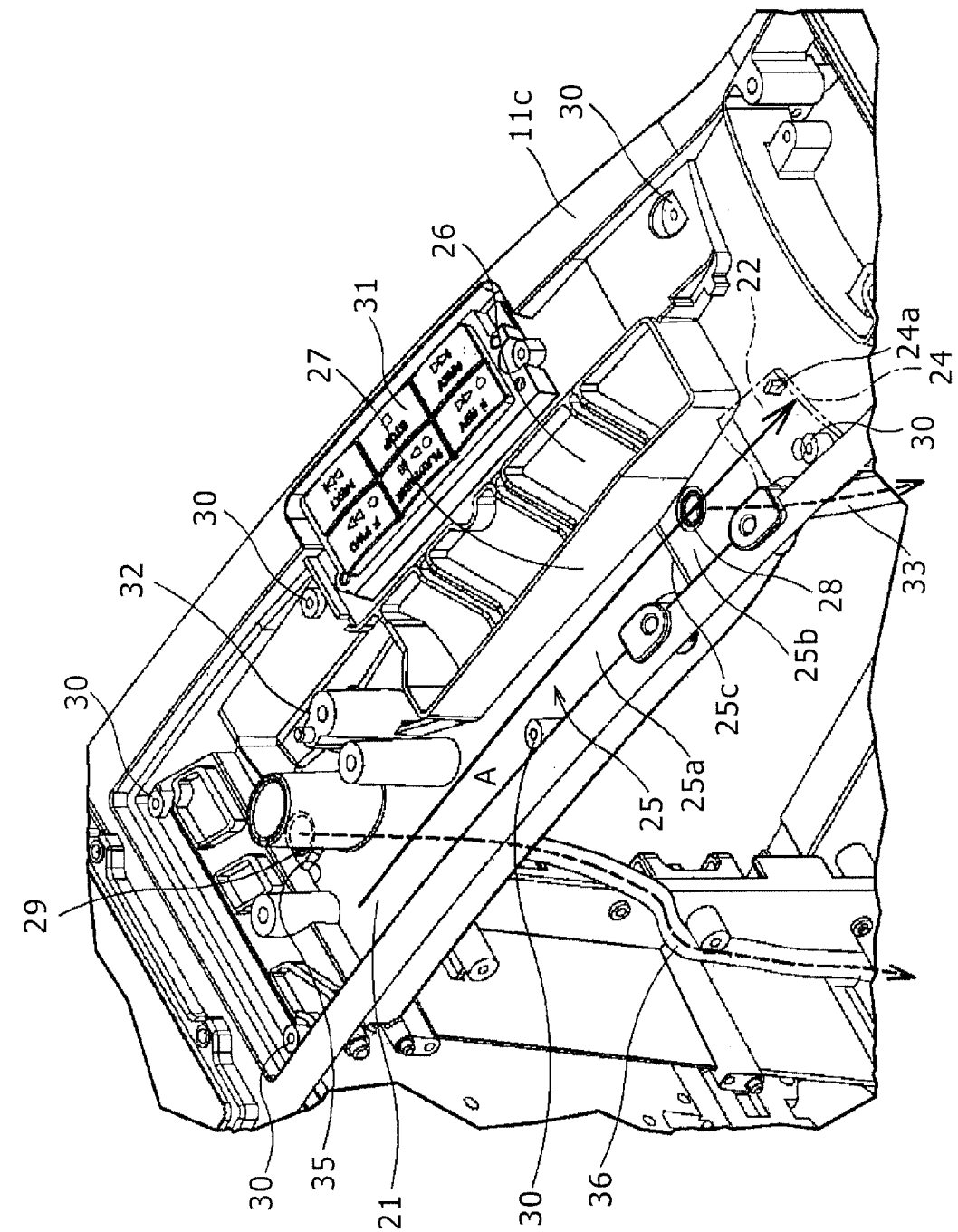
FIG. 4 is a perspective view of a recess in the heat dissipating section.
Figure 5A:
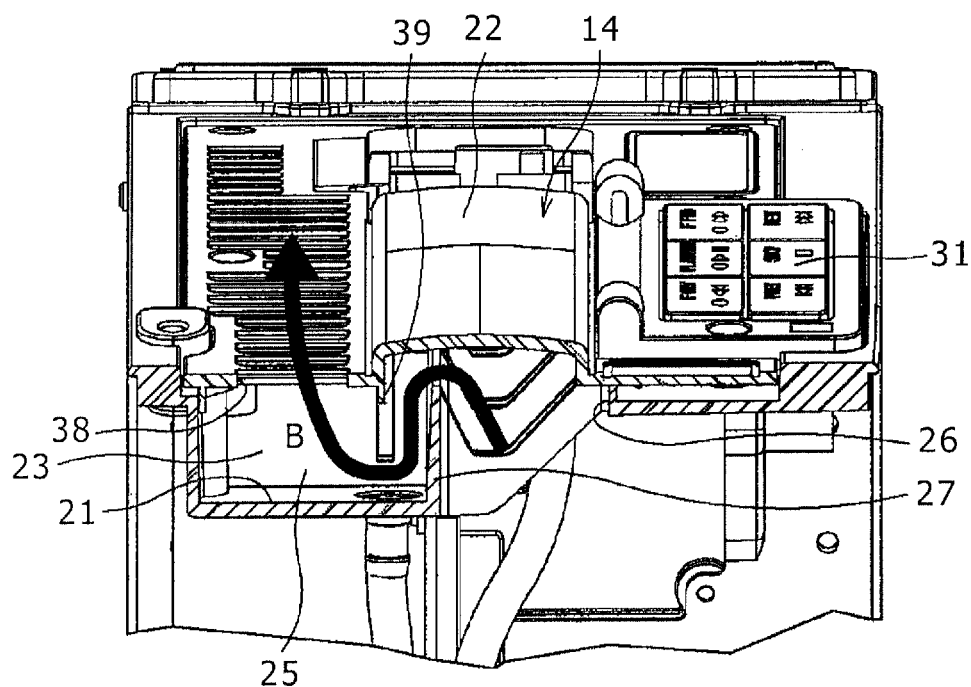
Figure 5B:
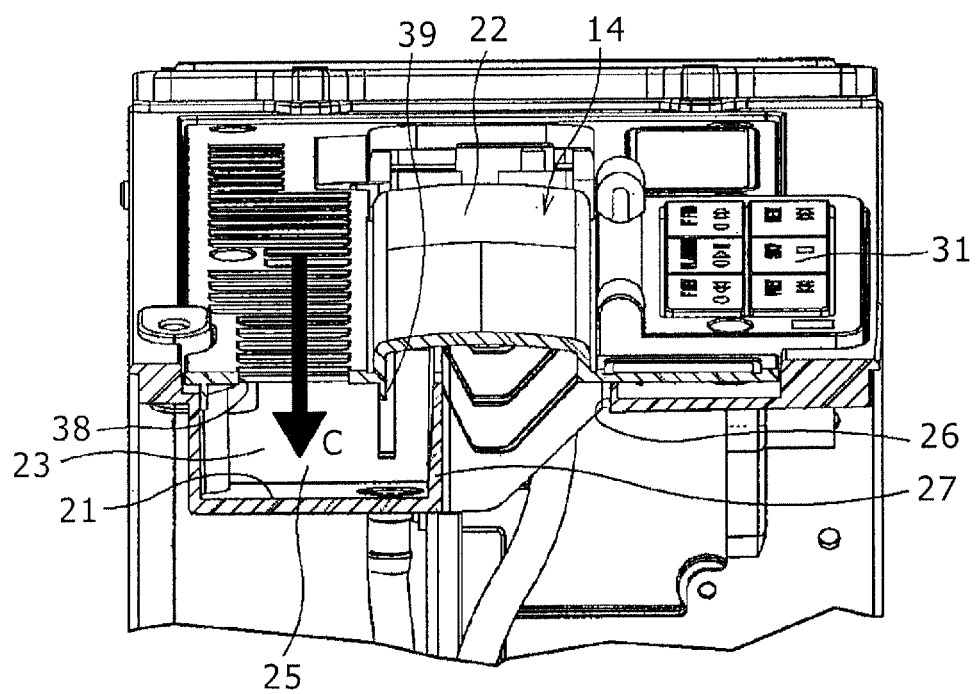

As shown in FIGS. 3 and 4, the heat dissipating section 14 is provided at the top surface 11*c* of the video camera 1. The heat dissipating section 14 has a recess 21 provided in the top surface 11*c* of the apparatus body 11, and a closing plate 22 mounted so as to close the recess 21. As shown in FIGS. 5A and 5B, the top surface 11*c* of the apparatus body 11 has a double-wall structure including a bottom surface of the recess 21 and the closing plate 22, with a space 23 being formed between the recess 21 and the closing plate 22. Further, as shown in FIGS. 3 and 4, at that portion of the recess 21 which is located on the side of the front surface 11*a* of the apparatus body 11, a drain port 24 making the space 23 communicate with the exterior is formed between the portion and the closing plate 22. The drain port 24 is an opening which is formed between the bottom surface of the recess 21 and the closing plate 22 on the front surface 11*a* side, owing to a structure wherein the front surface 11*a* side of the closing plate 22 is supported by a closing plate support piece 24*a* provided at the bottom surface of the recess 21, and which makes the space 23 communicate with the exterior.

As shown in FIG. 4, the recess 21 is provided in a substantially rectangular shape in the top surface 11*c* of the apparatus body 11. The bottom surface of the recess 21 is an inclined surface 25 sloping down from the side of the rear surface 11*b* toward the side of the front surface 11*a* of the apparatus body 11. Specifically, the inclined surface 25 includes a first inclined surface 25*a* provided on the side of the rear surface 11*b* of the apparatus body 11, and a second inclined surface 25*b* which is provided on the side of the front surface 11*a*, is continuous with the first inclined surface 25*a*, and is different from the first inclined surface 25*a* in angle of inclination. The first inclined surface 25*a* is formed along the inclined surface of the top surface 11*c* so as to have substantially the same inclination and curved surface as those of the inclined surface of the top surface 11*c*. The second inclined surface 25*b* is more gently inclined than the first inclined surface 25*a*, and causes the first inclined surface 25*a* and the top surface 11*c* of the apparatus body 11 to be continuous with each other. In other words, the inclined surface 25 constituting the bottom surface of the recess 21 has such an inclination as to generally slope down from the side of the rear surface 11*b* toward the side of the front surface 11*a* of the apparatus body 11, though the angle of inclination changes at an inflection part 25*c* at the boundary between the first inclined surface 25*a* and the second inclined surface 25*b*. Therefore, as indicated by arrow A in FIG. 4, the inclined surface 25 constituting the bottom surface of the recess 21 conducts waterdrops, which have penetrated into the space 23, toward the side of the front surface 11*a* of the apparatus body 11, so that the waterdrops are drained through the drain port 24 to the exterior of the space 23. Incidentally, the inclined surface 25 is not limited to a curved inclined surface but may be a flat inclined surface.

The bottom surface of the recess 21 is provided with a vent hole 26 through which the inside of the apparatus body 11 and the space 23 communicate with each other, and a first riser wall 27 provided adjacently to the vent hole 26 so as to rise toward the closing plate 22 side. In addition, the bottom surface of the recess 21 is provided with a first drain hole 28 formed in the second inclined surface 25*b*, and a second drain hole 29 formed on the rear surface 11*b* side of the first inclined surface 25*a*. Further, at the bottom surface of the recess 21, there are provided fastening parts 30 for fastening the recess 21 and the closing plate 22 to each other, a picture operating unit 31 for operating a picture displayed on a display unit, and a handle mounting part 32 for mounting the handle section 15 to the apparatus body 11.

The vent hole 26 is formed in the shape of a slot oriented along the longitudinal direction of the apparatus body 11. The vent hole 26 permits air heated by the heat radiating part 20 inside the apparatus body 11 to be discharged therethrough into the space 23.

The first riser wall 27 is formed to rise toward the closing plate 22 side, along the whole periphery of the vent hole 26. The first riser wall 27 serves as a partition between the inclined surface 25 and the vent hole 26, thereby preventing the waterdrops guided onto the inclined surface 25 from penetrating via the vent hole 26 into the inside of the apparatus body 11.

Figure 6:
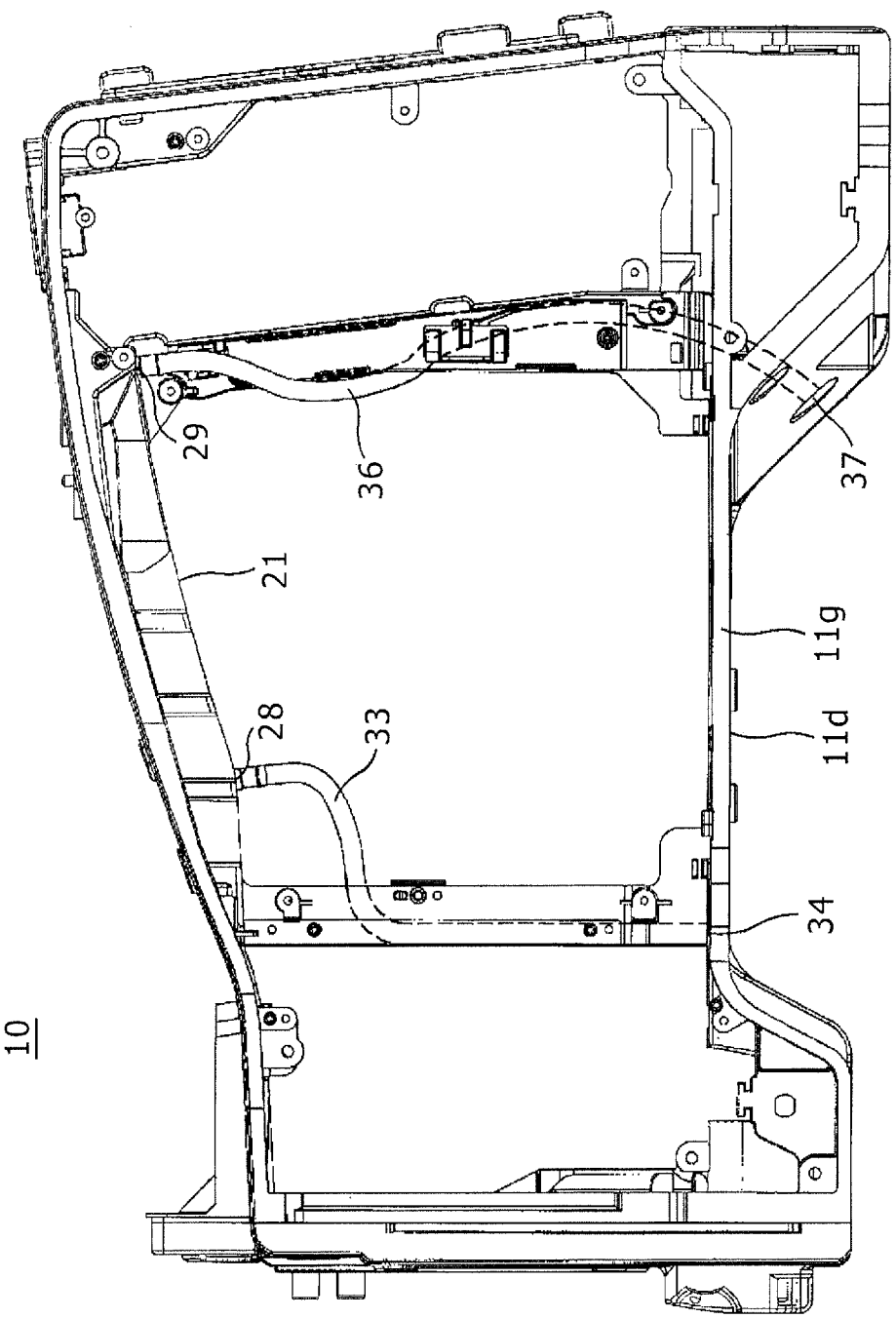
FIG. 6 is a side view of an apparatus body.

The first drain hole 28 is formed on the second inclined surface 25*b* in the vicinity of the inflection part 25*c*. As shown in FIG. 6, a flexible first drain pipe 33 is connected to the first drain hole 28. The first drain pipe 33 is connected at its one end to the first drain hole 28, and is connected at its other end to a first bottom surface drain hole 34 formed in the bottom surface 11*d* of the apparatus body 11. Besides, the first drain pipe 33 is provided in the manner of being wound around a frame 11*g*, and is fixed to the frame 11*g* by fixing members.

Therefore, when the bottom surface of the recess 21 is disposed to be higher on the front surface 11*a* side than on the rear surface 11*b* side such as when the user takes a high-angle shot, the waterdrops flowing into the inflection part 25*c* forming a hollow are guided by the first drain pipe 33 from the first drain hole 28 to the first bottom surface drain hole 34, to be drained to the exterior of the apparatus body 11. In this case, the first bottom surface drain hole 34 is formed on the side of the front surface 11*a* of the apparatus body 11, relative to the shoulder pad 16 provided on the bottom surface 11*d* of the apparatus body 11. Accordingly, the first bottom surface drain hole 34 is so configured that the user's shoulder would not be wetted through the shoulder pad 16.

As shown in FIG. 4, the second drain hole 29 is formed in the first inclined surface 25*a* at a position in the vicinity of a corner part 35 formed by the bottom surface of the recess 21 and a wall surface, on the rear surface 11*b* side, of the recess 21. As shown in FIG. 6, a flexible second drain pipe 36 is connected to the second drain hole 29. The second drain pipe 36 is connected at its one end to the second drain hole 29, and is connected at its other end to a second bottom surface drain hole 37 formed in the bottom surface 11*d* of the apparatus body 11. Besides, the second drain pipe 36 is provided in the manner of being wound around the frame 11*g* of the apparatus body 11, and is fixed to the frame 11*g* by fixing members.

Therefore, when the bottom surface of the recess 21 is disposed to higher on the front surface 11*a* side than on the rear surface 11*b* side such as when the user takes a high angle shot, the waterdrops flowing into the corner part 35 formed by the bottom surface of the recess 21 and the wall surface, on the rear surface 11*b* side, of the recess 21 are guided by the second drain pipe 36 from the second drain hole 29 to the second bottom surface drain hole 37, to be drained to the outside of the apparatus body 11. In this case, the second bottom surface drain hole 37 is formed on the side of the rear surface 11*b* of the apparatus body 11, relative to the shoulder pad 16 provided on the bottom surface 11*d* of the apparatus body 11. Accordingly, the second bottom surface drain hole 37 is so configured that the user's shoulder would not be wetted through the shoulder pad 16.

As shown in FIG. 4, the fastening parts 30 are screw holes for fastening the recess 21 and the closing plate 22 to each other. For example, a total of six fastening parts are provided in the recess 21, three on the side of the one-side side surface 11*e* of the apparatus body 11 and three on the side of the other-side side surface 11*f* of the apparatus body 11. Fastening members such as bolts are fastened to the fastening parts 30, whereby the recess 21 and the closing plate 22 are fastened to each other.

The picture operating unit 31 has buttons for effecting operations of such functions as playback, pause, fast forward (picture search), rewind, etc. The picture operating unit 31 applies such operations as playback, pause, fast forward, rewind, etc. to a picture which is recorded in the memory card and displayed on the display unit provided at the side surface 11*f* on the other side of the apparatus body 11. Therefore, when the video camera 1 is put on an appropriate base or in other similar situations, the user can check the imaged picture by operating the picture operating unit 31.

The handle mounting part 32 is a screw hole for fixing the handle section 15 and the frame 11*g* of the apparatus body 11 to each other. The handle section 15, which is mounted at its one end to the mounting part (not shown) of the top surface 11*c* of the apparatus body 11, is fastened at its other end to the handle mounting part 32 by a fastening member such as a bolt. Consequently, the handle section 15 is mounted to the apparatus body 11.

Figure 7:
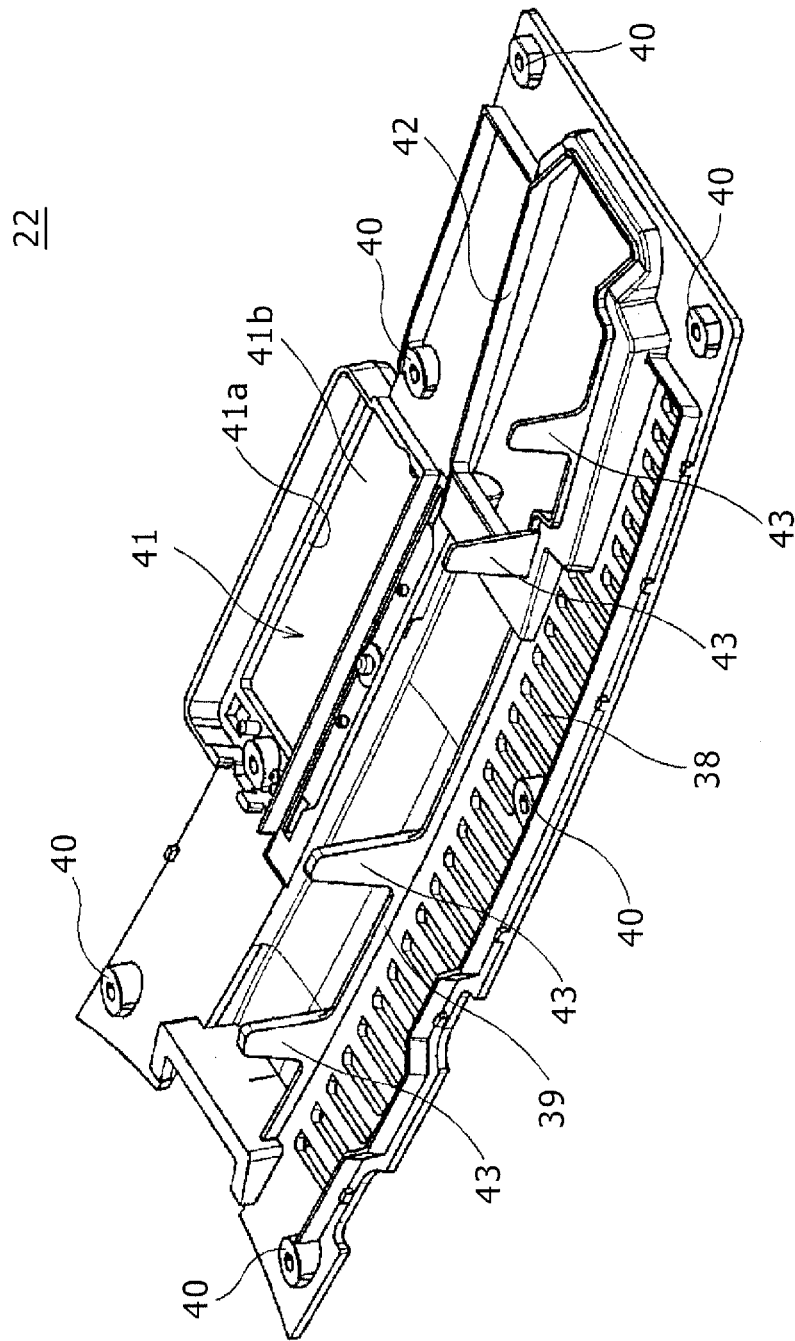
FIG. 7 is a rear view of a closing plate in the heat dissipating section.

As shown in FIGS. 3 and 7, the closing plate 22 is composed of a thin plate having substantially the same shape and size as those of the recess 21, and closes the recess 21. The closing plate 22 is provided with heat dissipating holes 38 making the space 23 communicate with the exterior, and is provided on the back side with a second riser wall 39 provided adjacently to the heat dissipating holes 38 so as to rise toward the recess 21 side. Besides, the closing plate 22 is provided with through-holes 40 for fastening to the recess 21, an operation window 41 for exposing an operating part of the recess 21 to the exterior, and an exposure port 42 for exposing the handle mounting part 32 of the recess 21 to the exterior, and is provided on the back side with support pieces 43 projecting toward the recess 21 side.

The heat dissipating holes 38 are formed in the closing plate 22, each in the shape of a slot oriented in the width direction of the closing plate 22, and are formed in plurality and arrayed in parallel to the longitudinal direction. The heat dissipating holes 38 permit air discharged from the inside of the apparatus body 11 into the space 23 through the vent hole 26 to be discharged to the exterior. Further, as shown in FIG. 5, the heat dissipating holes 38 are positionally deviated from the vent hole 26. Specifically, the heat dissipating holes 38 are deviated from the vent hole 26 in the left-right direction so as not to overlap with the vent hole 26, as viewed from the top surface 11c side. Therefore, the heat dissipating holes 38 prevent the waterdrops having penetrated through the heat dissipating holes 38 from entering into the inside of the apparatus body 11 directly through the vent hole 26.

The second riser wall 39 is formed along the periphery of the heat dissipating holes 38 on the side opposed to the vent hole 26. In order that air discharged from the inside of the apparatus body 11 into the space 23 through the vent hole 26 can easily flow to the exterior, the second riser wall 39 is formed at such a height as not to overlap with the first riser wall 27. The second riser wall 39 guides waterdrops, which have penetrated via the heat dissipating holes 38 and have flowed along the back surface of the closing plate 22, to the inclined surface 25. This ensures that the waterdrops having penetrated via the heat dissipating holes 38 and flowed along the back surface of the closing plate 22 are prevented from entering into the inside of the apparatus body 11 through dropping on the vent hole 26.

The through-holes 40 are provided at positions corresponding to the fastening parts 30 of the recess 21. The closing plate 22 is fastened to the recess 21 by a process in which the through-holes 40 are matched to the fastening parts 30 of the recess 21 and, thereafter, fastening members such as bolts are fastened to the fastening parts 30 of the recess 21 through the through-holes 40.

The operation window 41 is provided with an opening 41a for exposing the operating part of the recess 21 to the exterior, and a lid 41b which is turnably supported on the recess 21 and is turned to open and close the opening 41a. The operation window 41 exposes the picture operating unit 31 at the recess 21 to the exterior via the opening 41a when the lid 41b is turned by the user so as to open the opening 41a.

The exposure port 42 is provided at a position corresponding to the handle mounting part 32 of the recess 21. Therefore, the exposure port 42 exposes the handle mounting part 32 of the recess 21 to the exterior.

The support pieces 43 are provided, for example, integrally with the second riser wall 39. The support pieces 43 are formed to have such heights as to make contact with the inclined surface 25, and at predetermined intervals along the longitudinal direction. The support pieces 43 are brought into contact with the bottom surface of the recess 21, support the closing plate 22, thereby enhance the rigidity of the closing plate 22, and give an enhanced mechanical strength.

The closing plate 22 as above is formed by molding a synthetic resin. The closing plate 22 is formed from a synthetic resin or the like which is lower in thermal conductivity than metals or the like. Consequently, the closing plate 22 is not brought to a high temperature even when heated by air discharged via the vent hole 26, as compared with a closing plate formed of a metal or the like.

The heat dissipating section 14 configured as above ensures that as indicated by arrow B in FIG. 5A, air heated by the heat radiating part 20 inside the apparatus body 11 is discharged from the inside of the apparatus body 11 into the space 23 through the vent hole 26 of the recess 21 provided at the top surface 11c of the apparatus body 11, and is thereafter discharged from the space 23 to the exterior via the heat dissipating holes 38. In this manner, the heat dissipating section 14 causes natural heat dissipation through an upper portion of the apparatus body 11, whereby the inside of the apparatus body 11 is cooled.

Further, in the case where waterdrops or the like have penetrated via the heat dissipating holes 38, the heat dissipating section 14 guides the waterdrops to the inclined surface 25, as indicated by arrow C in FIG. 5B, since the heat dissipating holes 38 and the vent hole 26 are positionally deviated from each other. Furthermore, the heat dissipating section 14 ensures that waterdrops having penetrated via the heat dissipating holes 38 and flowed along the back surface of the closing plate 22 are dropped onto the inclined surface 25 by the second riser wall 39, whereby the waterdrops are guided to the inclined surface 25. In this case, the heat dissipating section 14 ensures that the waterdrops guided to the inclined surface 25 are prevented, by the first riser wall 27, from entering into the inside of the apparatus body 11 via the vent hole 26.

Besides, the heat dissipating section 14 ensures that when the user takes a roughly horizontal or low-angle shot or in other similar situations, waterdrops guided to the inclined surface 25 are conducted by the inclined surface 25 to the side of the front surface 11a of the apparatus body 11, to be drained via the drain port 24 to the exterior of the space 23. In addition, the heat dissipating section 14 ensures that when the user takes a high-angle shot or in other similar situations, waterdrops flowing into the inflection part 25c after being guided to the inclined surface 25 are guided from the first drain hole 28 to the first bottom surface drain hole 34, to be drained to the outside of the apparatus body 11. Further, the heat dissipating section 14 ensures that when the user takes a high-angle shot or in other similar situations, water drops flowing into the corner part 35 formed by the bottom surface of the recess 21 and that wall surface, on the rear surface 11b side, of the recess 21 are guided from the second drain hole 29 to the second bottom surface drain hole 37, to be drained to the exterior of the apparatus body 11.

[3. Working Effect of Video Camera]

As above-described, in the video camera 1 according to an embodiment of the present invention, air heated inside the apparatus body 11 is discharged from the inside of the apparatus body 11 into the space 23 through the vent hole 26 of the recess 21 provided at the top surface 11c constituting an upper portion of the apparatus body 11, and is then discharged from the space 23 to the exterior through the heat dissipating holes 38. This makes it possible to dissipate heat through the upper portion of the apparatus body 11, and to realize an enhanced heat dissipating efficiency. Further, the video camera 1 according to an embodiment of the present invention utilizes natural cooling, without using a cooling fan. This makes it possible to reduce the number of component parts, to reduce noise, and to suppress power consumption.

Furthermore, in the video camera 1 according to an embodiment of the present invention, the heat dissipating holes 38 and the vent hole 26 are positionally deviated from each other. Therefore, waterdrops having penetrated via the heat dissipating holes 38 can be guided to the inclined surface 25, and can be prevented from entering into the apparatus body 11 directly through the vent hole 26.

In addition, in the video camera 1 according to an embodiment of the present invention, the first riser wall 27 is formed on the bottom surface of the recess 21 adjacently to the vent hole 26. Therefore, waterdrops guided to the inclined surface 25 can be prevented from entering into the inside of the apparatus body 11 through the vent hole 26.

Besides, in the video camera 1 according to an embodiment of the present invention, the second riser wall 39 is formed on the back side of the closing plate 22 adjacently to the heat dissipating holes 38. This ensures that waterdrops having penetrated via the heat dissipating holes 38 and flowed along the back surface of the closing plate 22 can be dropped onto the inclined surface 25 and, hence, can be guided to the inclined surface 25. Consequently, the waterdrops can be prevented from entering into the inside of the apparatus body 11.

Further, in the video camera 1 according to an embodiment of the present invention, the bottom surface of the recess 21 is the inclined surface 25 sloping down from the side of the rear surface 11b toward the side of the front surface 11a of the apparatus body 11, and the drain port 24 is formed between that portion of the recess 21 which is located on the side of the front surface 11a of the apparatus body 11 and the top surface 11c. Therefore, waterdrops guided to the inclined surface 25 can be conducted by the inclined surface 25 toward the side of the front surface 11a of the apparatus body 11, to be drained through the drain port 24 to the exterior of the space 23.

In addition, in the video camera 1 according to an embodiment of the present invention, the recording and playback unit 19, which uses a memory card as a recording medium and which can be made smaller in size than a recording and playback unit using other recording medium than the memory card, is provided somewhat closer to the rear surface 11b of the apparatus body 11. This ensures that the inclined surface 25 can be shaped to be inclined more steeply and that waterdrops guided to the inclined surface 25 can be guided toward the side of the front surface 11a of the apparatus body 11 more easily, as compared with the case where other recording medium than a memory card is used.

Besides, the video camera 1 according to an embodiment of the present invention ensures that even when the user takes a high-angle shot, waterdrops flowing into the inflection part 25c after being guided to the inclined surface 25 can be conducted from the first drain hole 28 to the first bottom surface drain hole 34, to be drained to the exterior of the apparatus body 11.

Furthermore, the video camera 1 according to an embodiment of the present invention ensures that even when the user takes a high-angle short, waterdrops flowing into the corner part 35 formed by the recess 21 and the wall surface, on the rear surface 11b side, of the recess 21 can be conducted from the second drain hole 29 to the second bottom surface drain hole 37, to be drained to the outside of the apparatus body 11.

[4. Modifications]

Incidentally, in the video camera 1 according to an embodiment of the present invention, the drain holes may not necessarily be formed in the first inclined surface 25a and the second inclined surface 25b, and a drain hole may be formed in the inflection part 25c. Besides, in the video camera 1 according to an embodiment of the invention, the drain hole may be formed in only the first inclined surface 25a, may be formed in only the second inclined surface 25b, or may be formed in only the inflection part 25c. Further, in the video camera 1 according to an embodiment of the invention, the drain hole is not limited to the one formed in the corner part 35 of the first inclined surface 25a, and the drain hole may be formed in other location on the first inclined surface 25a.

In addition, in the video camera 1 according to an embodiment of the present invention, instead of providing the drain port 24 between the recess 21 and the closing plate 22, the waterdrops guided to the inclined surface 25 may be drained to the exterior of the space 23 via the first drain hole 28 and the second drain hole 29.

Besides, in the video camera 1 according to an embodiment of the present invention, a cooling fan may be provided inside the apparatus body 11, and forced heat dissipation through an upper portion of the apparatus body 11 may be performed.

Further, the video camera 1 according to an embodiment of the present invention is not limited to the one that uses a memory card as a recording medium; for example, other recording media than the memory card, such as a magnetic tape, an optical disk, a hard disk, etc. may also be used.

In addition, the video camera 1 according to an embodiment of the present invention is not limited to the one that is of the type of being carried on the user's shoulder; for example, a video camera of a handy type or an installed type may also be adopted.

Further, the imaging apparatus according to an embodiment of the present invention is not limited to a video camera but may be any one that consumes much power, has a high calorific value and is used mainly outdoors. Examples of such an imaging apparatus include a digital still camera, a camera using a silver salt film as a recording medium, etc.

The present application contains subject matter related to that disclosed in Japanese Priority Patent Application JP 2009-262094 filed in the Japan Patent Office on Nov. 17, 2009, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An imaging apparatus without a cooling fan comprising:
an apparatus body in which a heat radiating part is disposed; and
a heat dissipating section formed at an upper portion of the apparatus body, wherein
the heat dissipating section has a recess provided in an upper portion of the apparatus body, and a closing plate so mounted as to close the recess,
a space is formed between the recess and the closing plate,
the recess is formed with a single vent hole through which the inside of the apparatus body and the space communicate with each other, the vent hole formed in a shape of a slot oriented along a longitudinal direction of the apparatus body,
the closing plate is provided with a heat dissipating hole oriented in a width direction of the apparatus body through which the space communicates with the exterior, and
the vent hole and the heat dissipating hole are positionally deviated from each other.

2. The imaging apparatus according to claim 1, wherein the recess is formed with a first riser wall adjacently to the vent hole.

3. The imaging apparatus according to claim 2, wherein the closing plate is formed on a back side thereof with a second riser wall adjacently to the heat dissipating hole.

4. The imaging apparatus according to claim 3, wherein a bottom surface of the recess is an inclined surface sloping down from the side of a rear surface toward the side of a front surface of the apparatus body.

5. The imaging apparatus according to claim 3, wherein
a bottom surface of the recess is formed with a drain hole, and
a drain pipe for conducting to a bottom surface of the apparatus body is connected to the drain hole.

6. The imaging apparatus according to claim 3, wherein
a bottom surface of the recess has a first inclined surface sloping down from the side of a rear surface toward the side of a front surface of the apparatus body, and a second inclined surface continuous with the first inclined surface and different from the first inclined surface in angle of inclination;
the first inclined surface is formed with a drain hole; and
a drain pipe for conducting to a bottom surface of the apparatus body is connected to the drain hole.

7. The imaging apparatus according to claim 3, wherein
a bottom surface of the recess has a first inclined surface sloping down from the side of a rear surface toward the side of a front surface of the apparatus body, and a second inclined surface continuous with the first inclined surface and different from the first inclined surface in angle of inclination;
the second inclined surface is formed with a drain hole; and
a drain pipe for conducting to a bottom surface of the apparatus body is connected to the drain hole.

8. The imaging apparatus according to claim 3, wherein
a bottom surface of the recess has a first inclined surface sloping down from the side of a rear surface toward the side of a front surface of the apparatus body, and a second inclined surface continuous with the first inclined surface and different from the first inclined surface in angle of inclination;
the first inclined surface and the second inclined surface are formed with a drain hole; and
a drain pipe for conducting to a bottom surface of the apparatus body is connected to the drain hole.

9. The imaging apparatus according to claim 1, wherein that portion of the recess which is located on the side of a front surface of the apparatus body is formed with a drain port between itself and the closing plate.

* * * * *